US012688744B2

(12) United States Patent (10) Patent No.: US 12,688,744 B2
Thorsen et al. (45) Date of Patent: Jul. 21, 2026

(54) CHAT ENVIRONMENTS WITH VIRTUAL AGENTS FOR PREMISES MONITORING SYSTEMS

(71) Applicant: The ADT Security Corporation, Boca Raton, FL (US)

(72) Inventors: Wayne Thorsen, Boca Raton, FL (US); Mark Reimer, Denver, CO (US); Shy Ward, Flower Mound, TX (US)

(73) Assignee: The ADT Security Corporation, Boca Raton, FL (US)

( * ) Notice: Subject to any disclaimer, the term of this patent is extended or adjusted under 35 U.S.C. 154(b) by 90 days.

(21) Appl. No.: 18/736,864

(22) Filed: Jun. 7, 2024

(65) Prior Publication Data

US 2025/0037524 A1 Jan. 30, 2025

Related U.S. Application Data

(60) Provisional application No. 63/616,169, filed on Dec. 29, 2023, provisional application No. 63/516,367, filed on Jul. 28, 2023.

(51) Int. Cl.
| | |
|---|---|
| *G07C 9/00* | (2020.01) |
| *G06F 40/30* | (2020.01) |
| *G08B 25/00* | (2006.01) |
| *H04L 51/02* | (2022.01) |

(52) U.S. Cl.
CPC ......... *G07C 9/00571* (2013.01); *G06F 40/30* (2020.01); *G08B 25/008* (2013.01); *H04L 51/02* (2013.01)

(58) Field of Classification Search
None
See application file for complete search history.

(56) References Cited

U.S. PATENT DOCUMENTS

| | | | |
|---|---|---|---|
| 9,100,453 | B2 | 8/2015 | Chen et al. |
| 9,626,841 | B2 | 4/2017 | Fadell et al. |
| 10,490,003 | B2 | 11/2019 | Eyring et al. |
| 10,565,856 | B2 | 2/2020 | Sol |

(Continued)

FOREIGN PATENT DOCUMENTS

| | | | | |
|---|---|---|---|---|
| KR | 20190069218 A | * | 6/2019 | ............. H04L 51/02 |
| WO | 2019128681 A1 | | 7/2019 | |

OTHER PUBLICATIONS

International Search Report and Written Opinion dated Oct. 28, 2024 for International Application No. PCT/US2024/038557 filed on Jul. 18, 2024, consisting of 28 pages.

*Primary Examiner* — K. Wong
(74) *Attorney, Agent, or Firm* — Weisberg I.P. Law, P.A.

(57) ABSTRACT
A system comprising at least one computing device is provided. The at least one computing device is configured to monitor a chat environment associated with a plurality of users corresponding to a premises having a premises monitoring system, determine that a chat message in the chat environment invokes a chatbot associated with the premises monitoring system, and in response to determining that the chat message invokes the chatbot, determine that the chat message comprises an access command for the premises monitoring system. The at least one computing device is further configured to store access data based on the access command to facilitate the premises monitoring system implementing the access command.

20 Claims, 11 Drawing Sheets

(56) References Cited

U.S. PATENT DOCUMENTS

| | | | |
|---|---|---|---|
| 10,567,312 B2 | 2/2020 | Goldberg et al. | |
| 10,586,114 B2 | 3/2020 | Potter et al. | |
| 10,629,015 B1 | 4/2020 | Burge et al. | |
| 10,635,907 B2 | 4/2020 | Child et al. | |
| 10,750,128 B2 | 8/2020 | Fu et al. | |
| 10,832,509 B1 | 11/2020 | Read et al. | |
| 10,861,265 B1 | 12/2020 | Merkley et al. | |
| 10,999,561 B2 | 5/2021 | Child et al. | |
| 11,455,854 B2 | 9/2022 | Hager et al. | |
| 11,477,139 B2 | 10/2022 | Rosenberg et al. | |
| 11,495,117 B2 * | 11/2022 | Farrand | G08B 25/001 |
| 11,663,422 B2 * | 5/2023 | Pandey | G06F 40/30 |
| | | | 704/2 |
| 11,735,018 B2 | 8/2023 | Khadloya et al. | |
| 12,184,592 B1 * | 12/2024 | Eo | H04L 51/02 |
| 2016/0014103 A1 | 1/2016 | Masters et al. | |
| 2016/0078699 A1 | 3/2016 | Kalb et al. | |
| 2017/0064261 A1 | 3/2017 | Peng et al. | |
| 2017/0373876 A1 | 12/2017 | Scalisi | |
| 2018/0005143 A1 | 1/2018 | Camargo et al. | |
| 2018/0025726 A1 | 1/2018 | Gatti de Bayser et al. | |
| 2018/0139069 A1 | 5/2018 | Rawlins et al. | |
| 2018/0350170 A1 | 12/2018 | Wang et al. | |
| 2020/0234520 A1 | 7/2020 | Carbonell et al. | |
| 2020/0311204 A1 * | 10/2020 | Gupta | G06F 40/35 |
| 2021/0134100 A1 | 5/2021 | LaRovere et al. | |
| 2021/0232983 A1 | 7/2021 | Camargo et al. | |
| 2022/0237972 A1 | 7/2022 | Read et al. | |
| 2023/0012098 A1 | 1/2023 | Trösch | |
| 2023/0083819 A1 | 3/2023 | Hager et al. | |

* cited by examiner

Private Chat Environment

@Person 1: Hey neighbor, I'm going to be traveling next Friday-Monday, would you mind watering my indoor plants?

@Person 2: Absolutely! Where are you going? I wonder what you will bring back for me? ☺

@Person 1: We are heading to Hawaii. I bet you can't guess what we will bring you.

@Person 1: Hey @Virtual Agent give @Person 2's family access to my home while I'm traveling.

@Virtual Agent: @Person 2 and @Person 3 will have access to @Person 1's home starting Friday until midnight on Monday.

@Virtual Agent: @Person 2 accessed @Person 1's home at 9:03 am.

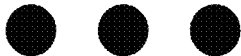

FIG. 10

Figure 11:
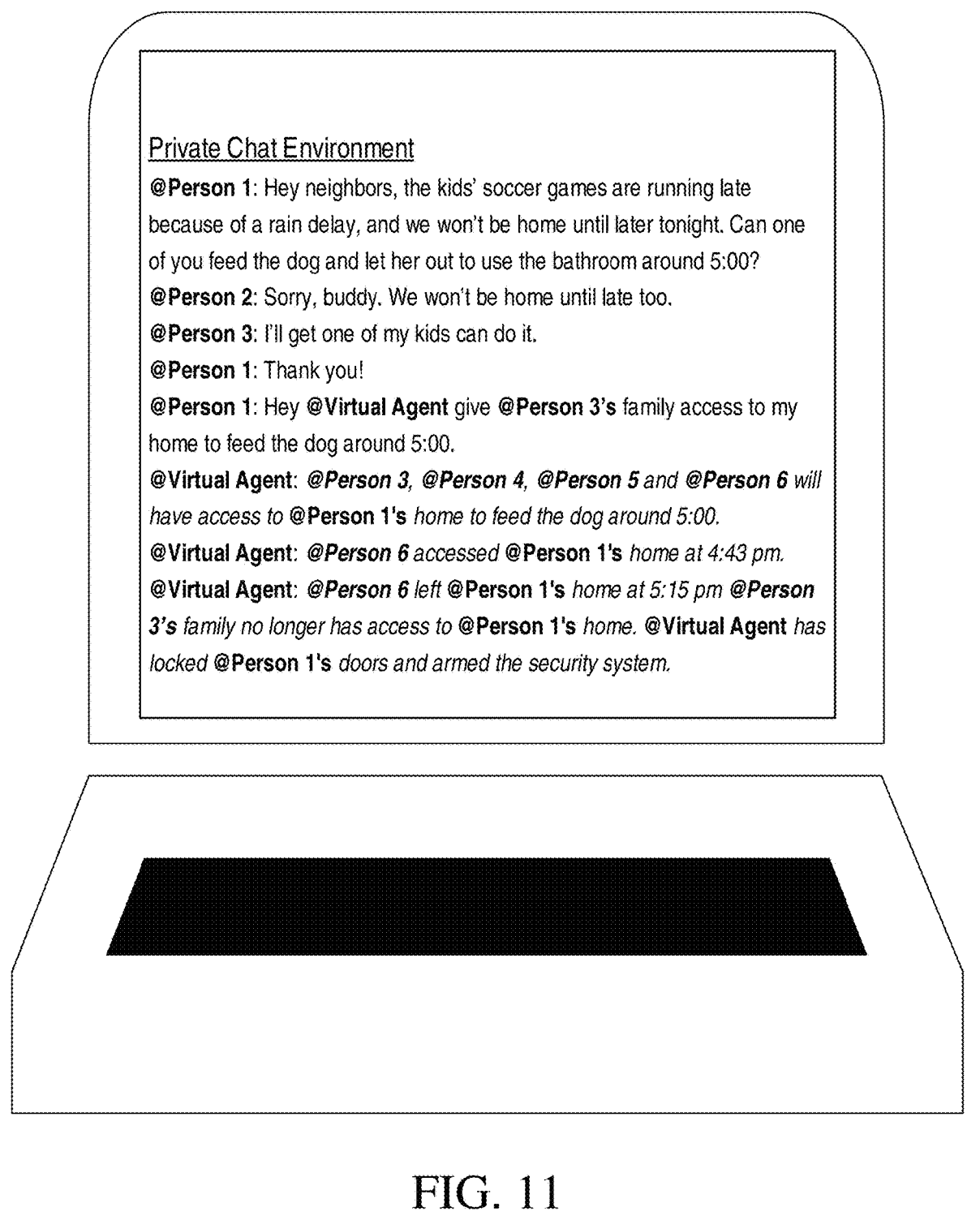

Private Chat Environment

@Person 1: Hey neighbors, the kids' soccer games are running late because of a rain delay, and we won't be home until later tonight. Can one of you feed the dog and let her out to use the bathroom around 5:00?

@Person 2: Sorry, buddy. We won't be home until late too.

@Person 3: I'll get one of my kids can do it.

@Person 1: Thank you!

@Person 1: Hey @Virtual Agent give @Person 3's family access to my home to feed the dog around 5:00.

@Virtual Agent: *@Person 3, @Person 4, @Person 5 and @Person 6 will have access to @Person 1's home to feed the dog around 5:00.*

@Virtual Agent: *@Person 6 accessed @Person 1's home at 4:43 pm.*

@Virtual Agent: *@Person 6 left @Person 1's home at 5:15 pm @Person 3's family no longer has access to @Person 1's home. @Virtual Agent has locked @Person 1's doors and armed the security system.*

Private Chat Environment

@Person 1: Hey neighbors, my new phone is supposed to be delivered today, but I'm out of town. If any of you see a package at my door, could you put it inside?

@Person 2: Sure, if I see it, I'll put it in your house.

@Person 3: I'd be happy to if I see it.

@Person 4: I can do it too.

@Person 1: Thanks!

@Person 1: Hey @Virtual Agent give my @Neighbors access to my home today for package deliveries.

@Virtual Agent: @Person 3, @Person 2, @Person 4, @Person 5, @Person 6, and @Person 7 will have access to @Person 1's home after a package arrives.

@Virtual Agent: A package has been detected on @Person 1's doorbell camera at 1:13 pm. @Person 3, @Person 2, @Person 4, @Person 5, @Person 6, and @Person 7 have access to @Person 1's home.

@Virtual Agent: @Person 4 accessed @Person 1's home at 1:18 pm.

@Virtual Agent: @Person 4 left @Person 1's home at 1:18 pm. @Person 3, @Person 2, @Person 4, @Person 5, @Person 6, @Person 7 no longer have access to @Person 1's home. @Virtual Agent has locked @Person 1's doors and armed the security system.

@Person 4: I saw a package and put it inside your house, but it wasn't your phone. It was a really big box.

Continued in FIG. 12B

FIG. 12B

From FIG. 12A

Private Chat Environment

@Person 1: Oh, that was probably my new vacuum. Thanks for putting it inside!

@Virtual Agent: A package has been detected on @Pereson 1's doorbell camera at 4:28 pm. @Person 3, @Person 2, @Person 4, @Person 5, @Person 6, and @Person 7 have access to @Person 1's home.

@Virtual Agent: @Person 7 accessed @Person 1's home at 4:37 pm.

@Virtual Agent: @Person 7 left @Person 1's home at 4:38 pm. @Person 3, @Person 2, @Person 4, @Person 5, @Person 6, @Person 7 no longer have access to @Person 1's home. @Virtual Agent has locked @Person 1's doors and armed the security system.

@Person 7: I just put your package inside. I think it was your phone.

CHAT ENVIRONMENTS WITH VIRTUAL AGENTS FOR PREMISES MONITORING SYSTEMS

CROSS-REFERENCE TO RELATED PATENT APPLICATIONS

This application claims priority to U.S. Provisional Patent Application Ser. No. 63/516,367, filed on Jul. 28, 2023, entitled METHODS AND SYSTEMS FOR CONTEXT BASED PREMISES ACCESS, and to U.S. Provisional Patent Application Ser. No. 63/616,169, filed on Dec. 29, 2023, entitled CHAT ENVIRONMENTS WITH VIRTUAL AGENTS FOR PREMISES SECURITY SYSTEMS, the entireties of which are incorporated herein by reference.

TECHNICAL FIELD

The present technology is generally related to chat environments with virtual agents for premises monitoring systems.

BACKGROUND

Premises monitoring systems, such as home and business security alarm systems, are typically used to monitor a premises for detectable events that may trigger an alarm or some other action when the premises monitoring system is in an armed state. Some premises monitoring systems control access to premises by locking and unlocking doors and other points of entry.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 10 is a diagram of an example message exchange in the private chat environment from the perspective of a user device according to one or more embodiments of the present disclosure;

FIG. 11 is a diagram of another example message exchange in the private chat environment from the perspective of a user device according to one or more embodiments of the present disclosure; and FIGS. 12A-12B are diagrams of another example message exchange in the private chat environment from the perspective of a user device according to one or more embodiments of the present disclosure.

DETAILED DESCRIPTION

The present disclosure relates to chat environments with virtual agents for premises monitoring systems.

Figure 1:
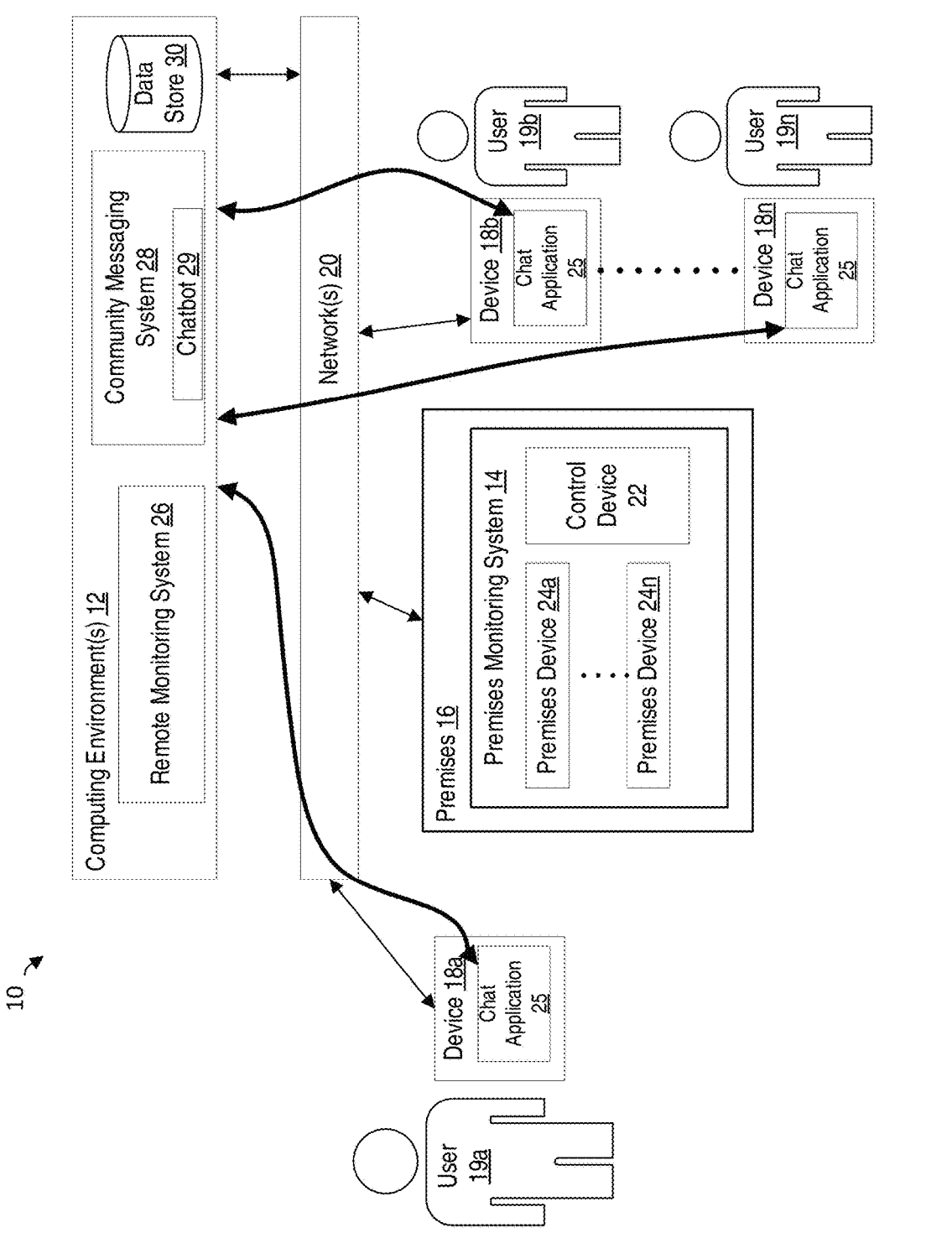
FIG. 1 is a block diagram of an example system according to some embodiments of the present disclosure.

FIG. 1 is a block diagram of an example system 10 according to some embodiments of the present disclosure. System 10 may comprise computing environment 12, premises monitoring systems 14 for monitoring premises 16, one or more user devices 18a-18n (collectively referred to as user device 18) associated with a respective user 19a-19n (collectively referred to as user 19), where one or more components and/or entities of system 10 may be in communication with each other via one or more networks 20.

Premises monitoring system 14 may comprise at least one control device 22 and a plurality of premises devices 24a-24n (collectively referred to as premises device 24) in communication with each other via one or more networks. Additionally, premises monitoring system 14 and/or premises device 24 may be configured to communicate with computing environment 12 via network 20. Computing environment 12 may comprise remote monitoring system 26, community messaging system 28 and data store 30.

Network 20 can include, for example, one or more intranets, extranets, wide area networks (WANs), local area networks (LANs), wired networks, wireless networks, satellite networks, Data Over Cable Service Interface Specification (DOCSIS) networks, cellular networks, Plain Old Telephone Service (POTS) networks, and/or other types of networks. Network 20 may support one or more communication protocols, one or more wired communication links, one or more wireless communication links, etc.

Premises monitoring system 14 may be configured to provide functionality relating to premises monitoring. For example, premises monitoring system 14 may be used to detect burglaries, smoke, fires, carbon monoxide leaks, water leaks, a recognized person using, for example, facial recognition, etc. and report detected events to remote monitoring system 26. Additionally, the premises monitoring functionality performed by premises monitoring system 14 may include home automation functionality. Examples of home automation functionality include thermostat control, door lock control, lighting control, appliance control, entertainment system control, etc.

Control device 22 may be configured to control various aspects of premises monitoring system 14. For example, control device 22 may be configured to control premises devices 24, such as locks, doors, windows, actuators, valves, motors, video doorbell cameras, and any other controllable devices associated with premises monitoring system 14. Control device 22 may include a user interface, such as buttons, a touch screen, a display, a microphone, a speaker, and/or other types of user interface components, to facilitate a user interacting with and controlling premises monitoring system 14. According to various embodiments, control device 22 may be, or include, a wall-mountable panel device (e.g., a wall-mounted alarm system panel), a tabletop panel device (e.g., a tabletop alarm system panel), a gateway device, a hub, a keypad, a remote control, and/or another type of device configured to control aspects of premises monitoring system 14.

Premises device 24 may include sensors, devices configured to capture audio, images, and/or video, and/or other devices. For example, premises devices 24 may include motion sensors, fire sensors, smoke sensors, heat sensors, carbon monoxide sensors, flood sensors, flow sensors, level sensors, temperature sensors, humidity sensors, proximity sensors, contact sensors, glass break sensors, water consumption sensors, water pressure sensors, etc. Devices configured to capture audio, images, and/or video may be referred to as media devices and may include still image cameras, video cameras, video doorbell cameras, microphones, etc. Additional examples of premises devices 24 include sirens, garage door controllers, doorbells, temperature sensors, humidity sensors, lighting devices, switches, electrical outlets, and electrical plugs.

User device 18 may be a smartphone, tablet computer, personal computer, wearable device, or another type of device that a user 19 can operate to communicate and interact with a premises monitoring system 14 and/or remote monitoring system 26. Chat application 25 (which may include one or more software applications) may be installed in user device 18 and can be used to: communicate with other user devices 18 in a private chat environment, and control, monitor, and/or interact with various aspects of a premises monitoring system 14 and/or remote monitoring system 26. Chat application 25 may also render one or more user interfaces that may facilitate a user 19: requesting one or more other users 19 to register for participation in a community group (e.g., a group of neighbor(s)), registering for the group, and/or communicating in the private chat environment. The communications (e.g., text messages) in the private chat environment may include invoking a virtual bot to grant one or more users 19 access to the premises 16 under one or more access conditions, as described herein. In one or more embodiments, a private chat environment via chat application 25 is configured to provide encrypted messaging. In some embodiments, the chat application 25 may be a downloadable application installed in the user device 18 developed and distributed by the operator of the remote monitoring system 26. In some alternative embodiments, the chat application 25 may be a web browser configured to access and render network pages, such as web pages, served by the remote monitoring system 26 and other devices.

Remote monitoring system 26 of computing environment 12 may be configured to provide remote monitoring services for multiple premises monitoring systems 14. For example, in the event that an open door, open window, glass break, etc. is detected by a premises device 24 when a premises monitoring system 14 is in an armed state, the premises monitoring system 14 may transmit an alarm signal to remote monitoring system 26. In response, an agent associated with remote monitoring system 26 may notify first responders, such as police, fire, emergency medical responders, etc., and/or one or more designated users 19 associated with the premise monitoring system 14. Further, even if disarmed, premises monitoring system 14 may still monitoring the premises 16 such as, for example, monitoring a user 19's access to premises 16.

Community messaging system 28 may provide and manage one or more private chat environments. In particular, community messaging system 28 is configured to register one or more users 19 to a group where users 19 in the group are allowed to communicate with each other in a private chat environment, i.e., only users 19 in the group can communicate in the private chat environment. Community messaging system 28 comprises a chatbot 29 that is configured to monitor messages in the private chat environment for invocation of the chatbot 29 by a user 19, and perform natural language analytics on one or more messages when the chatbot 29 is invoked, as described herein. Computing environment 12 via community messaging system 28 and/or chatbot 29 may be configured to provide access to one or more users 19 based on at least one access condition being satisfied as described herein.

Data store 30 may at least temporarily store data for retrieval, management and/or analysis. In particular, data store 30 may be configured to at least temporarily store data associated with computing environment 12 and premises monitoring systems 14. For example, the data stored in the data store 30 can include, but is not limited to, user profile(s), group(s) of users assigned to respective chat environments, access condition(s), media data, message history which may be retained for a configurable amount of time (e.g., 12 months, 24 months, etc.), records, sensor data, data associated with premises monitoring system 14, data associated with user devices 18, and other types of data.

Figures 2, 3:
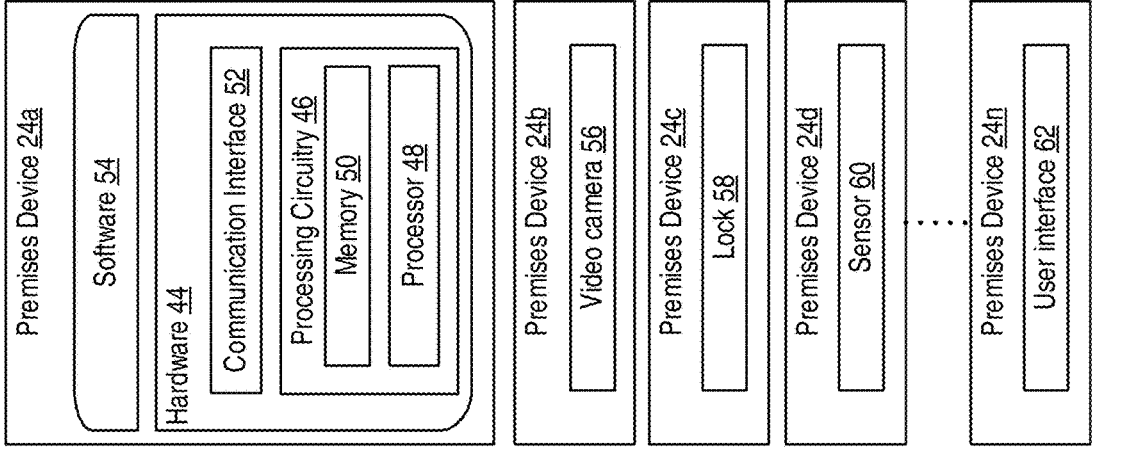
FIG. 2 is a block diagram of an example control device of the system of FIG. 1 according to various embodiments of the present disclosure.
FIG. 3 is a block diagram of an example premises devices of the system of FIG. 1 according to various embodiments of the present disclosure.

Referring to FIG. 2, shown is a block diagram illustrating an example control device 22 of premises monitoring system 14. As shown, control device 22 comprises hardware 32. The hardware 32 may include processing circuitry 34. The processing circuitry 34 may include one or more processors 36 and one or more memories 38. Each processor 36 may include and/or be associated with one or more central processing units, data buses, buffers, and interfaces to facilitate operation. In addition to or instead of a processor 36 and memory 38, the processing circuitry 34 may comprise other types of integrated circuitry that performs various functionality. Integrated circuitry may include one or more processors 36, processor cores, field programmable gate arrays (FPGAs), application specific integrated circuits (ASICs), graphics processing units (GPUs), Systems on Chips (SoCs), or other components configured to execute instructions. The processor 36 may be configured to access (e.g., write to and/or read from) the memory 38, which may comprise any kind of volatile and/or nonvolatile memory, e.g., cache, buffer memory, random access memory (RAM), read-only memory (ROM), optical memory, and/or erasable programmable read-only memory (EPROM). Further, memory 38 may be embodied in the form of one or more storage devices. The processing circuitry 34 may be configured to perform various functionality described herein. For example, computer instructions may be stored in memory 38 and/or another computer-readable medium that, when executed by processor 36, causes the processor 36 to perform various functionality described herein.

Hardware 32 may include communication interface 40 enabling control device 22 to communicate with one or more elements in system 10. For example, communication interface 40 may be configured for establishing and maintaining at least a wireless or wired connection with one or more elements of system 10 such as premises device 24 or computing environment 12 or user device 18.

Control device 22 further has software 42 (which may include one or more software applications) stored internally in, for example, memory 38, or stored in external memory (e.g., database, storage array, network storage devices, etc.) accessible by the control device 22 via an external connection. Software 42 may include any software or program that configures processing circuitry 34 to perform the steps or processes such as one or more of: disarming or arming the premises monitoring system 14 based on command(s) received from computing environment 12, unlocking or locking door(s) based on command(s) received from computing environment 12, etc.

The processing circuitry 34 may be configured to control any of the methods and/or processes described herein and/or to cause such methods, and/or processes to be performed, e.g., by control device 22. Processor 36 corresponds to one or more processors 36 for performing control device 22 functions described herein. The memory 38 is configured to store data and/or files and/or other information/data. In some embodiments, the software 42 may include instructions that, when executed by the processor 36 and/or processing circuitry 34, causes the processor 36 and/or processing circuitry 34 to perform the processes with respect to control device 22. Accordingly, by having computer instructions stored in memory 38 accessible to the processor 36, the processor 36 may be configured to perform the actions described herein.

FIG. 3 is a block diagram illustrating several example premises devices 20*a-n* (referred to collectively herein as premises devices 24) according to some embodiments of the present disclosure. As shown, premises device 24*a* comprises hardware 44. The hardware 44 may include processing circuitry 46. The processing circuitry 46 may include one or more processors 48 (i.e., one or more premises device processors) and one or more memories 50. Each processor 48 may include and/or be associated with one or more central processing units, data buses, buffers, and interfaces to facilitate operation. In addition to or instead of a processor 48 and memory 50, the processing circuitry 46 may comprise other types of integrated circuitry that performs various functionality. Integrated circuitry may include one or more processors 48, processor cores, FPGAs, ASICs, GPUs, SoCs, or other components configured to execute instructions. The processor 48 may be configured to access (e.g., write to and/or read from) the memory 50, which may comprise any kind of volatile and/or nonvolatile memory, e.g., cache, buffer memory, RAM, ROM, optical memory, and/or EPROM. Further, memory 50 may be embodied in the form of one or more storage devices. The processing circuitry 46 may be configured to perform various functionality described herein. For example, computer instructions may be stored in memory 50 and/or another computer-readable medium that, when executed by processor 48, causes the processor 48 to perform various functionality associated premises device 24*a*.

Hardware 44 may include communication interface 52 facilitating communication between premises device 24*a* and one or more elements in system 10. For example, communication interface 52 may be configured for establishing and maintaining at least a wireless or wired connection with one or more elements of system 10 such as control device 22 and/or computing environment 12.

Premises device 24*a* further has software 54 (which may include one or more software applications) stored internally in, for example, memory 50, or stored in external memory (e.g., database, storage array, network storage devices, etc.) accessible by the premises device 24*a* via an external connection. Software 54 may include any software or program that configures processing circuitry 46 to perform the steps or processes of the present disclosure.

The processing circuitry 46 may be configured to control any of the methods and/or processes described herein and/or to cause such methods, and/or processes to be performed, e.g., by premises device 24*a*. Processor 48 corresponds to one or more processors 48 for performing premises device 24*a* functions described herein. The memory 50 is configured to store data and/or files and/or other information/data. In some embodiments, the software 54 may include instructions that, when executed by the processor 48 and/or processing circuitry 46, causes the processor 48 and/or processing circuitry 46 to perform the processes described herein with respect to premises device 24*a*. Accordingly, by having computer instructions stored in memory 50 accessible to the processor 48, the processor 48 may be configured to perform the actions described herein.

In one or more embodiments, premises device 20*b* includes the same or similar hardware as premises device 24*a* described above, except that premises device 20*b* further includes video camera 56 that is configured to capture at least one of video, audio or still images. In one or more embodiments, premises device 20*b* may be a video doorbell camera. In one or more embodiments, premises device 20*c* includes the same or similar hardware as premises device 24*a* described above, except that premises device 20*c* further includes lock 58. For example, lock 58 may comprise an electrically actuatable door locking mechanism where premises device 20*c* may receive a command to lock or unlock the door locking mechanism and actuate the door locking mechanism according to the command. In one or more embodiments, premises device 20*c* is positioned at and/or proximate an access point or location of premises 16.

In one or more embodiments, premises device 20*d* includes the same or similar hardware as premises device 24*a* described above, except that premises device 20*c* further includes one or more sensor(s) 60 configured to sensing as described herein. In one or more embodiments, premises device 20*n* is a monitoring interface device that includes the same or similar hardware as premises device 24*a* described above, except that premises device 20*n* further includes user interface 62 such as a control panel touchscreen or buttons to allow a user 19 to interface with premises device 20*n*. In other words, each premises device 24 may comprise hardware and software that is similar to the hardware and software described with respect to premises device 24*a*, but with other elements to provide desired functionality, e.g., sensing, locking, user interface, etc.

Figure 4:
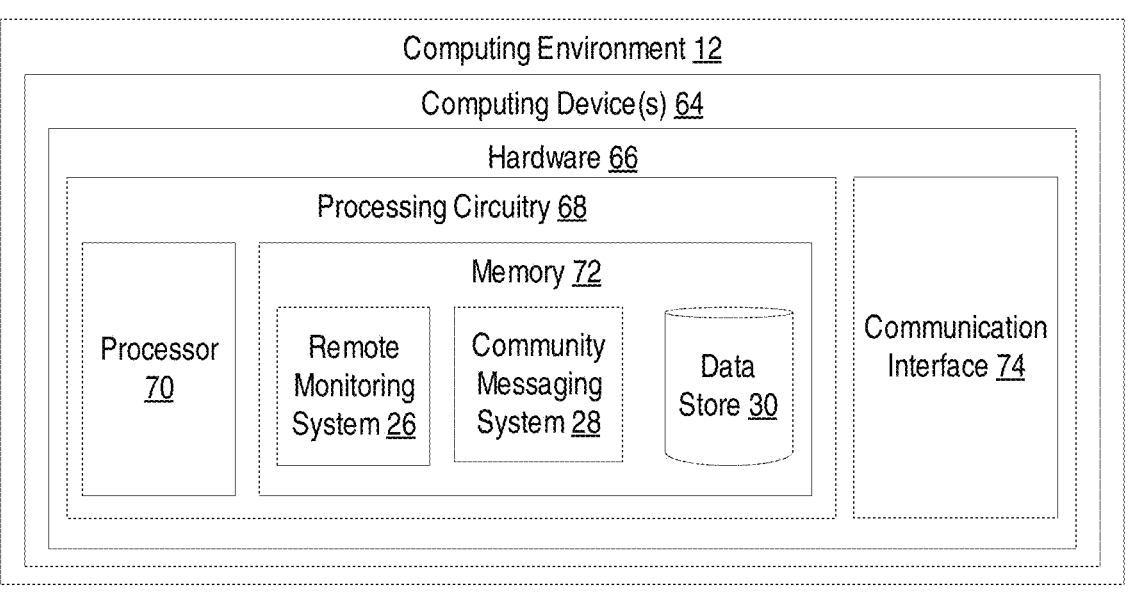
FIG. 4 is a block diagram of an example computing environment 12 of the system of FIG. 1 according to various embodiments of the present disclosure.

FIG. 4 is a block diagram illustrating the example computing environment 12 according to various embodiments. As shown, the computing environment 12 may include one or more computing devices 64, such as servers (not shown). According to various embodiments, the computing devices 64 can be located in a single geographical location (e.g., a data center) or distributed across multiple geographic locations. In some embodiments, the computing devices 64 can provide elastic computing resources in which the allotted capacity of computing-related resources of the computing environment 12 may vary over time for the remote monitoring system 26, community messaging system 28, and/or other components.

As shown, each computing device 64 comprises hardware 66. The hardware 66 may include processing circuitry 68. The processing circuitry 68 may include one or more processors 70 and one or more memories 72. Each processor 70 may include and/or be associated with one or more central processing units, data buses, buffers, and interfaces to facilitate operation. In addition to or instead of a processor 70 and memory 72, the processing circuitry 68 may comprise other types of integrated circuitry that perform various functionality. Integrated circuitry may include one or more processors 70, processor cores, FPGAs, ASICs, GPUs, SoCs, or other components configured to execute instructions. The processor 70 may be configured to access (e.g., write to and/or read from) the memory 72, which may comprise any kind of volatile and/or nonvolatile memory, e.g., cache, buffer memory, RAM, ROM, optical memory, and/or EPROM. Further, memory 72 may be embodied in the form of one or more storage devices. The processing circuitry 68 may be configured to perform various functionality described herein. For example, computer instructions may be stored in memory 72 and/or another computer-readable medium that, when executed by processor 70, causes the processor 70 to perform various functionality.

Hardware 66 may include communication interface 74 facilitating communication between computing devices 64 and one or more elements in system 10. For example, communication interface 74 may be configured for establishing and maintaining at least a wireless or wired connection with one or more elements of system 10 such as control device 22, premises device 24, data store 30, user devices 18, etc.

The processing circuitry 68 may be configured to control any of the methods and/or processes described herein and/or to cause such methods, and/or processes to be performed, e.g., by computing environment 12. Processor 70 corresponds to one or more processors 70 for performing computing device 64 functions described herein. The memory 72 is configured to store data and/or files such as computing environment data and/or other information/data. Also stored in the memory 72 and executable by the processor 70 are the remote monitoring system 26 and community messaging system 28. Although FIG. 4 shows the remote monitoring system 26 and community messaging system 28 in a single computing device 64, the remote monitoring system 26 and community messaging system 28 may execute in multiple computing devices 64 of the computing environment 12. To perform the functionality of the remote monitoring system 26 and community messaging system 28, the memory 72 may include instructions that, when executed by the processor 70 and/or processing circuitry 68, causes computing device 64 to perform the processes described herein with respect to the remote monitoring system 26, community messaging system 28, and/or other components of the computing environment 12. Accordingly, by having computing instructions stored in memory 72 accessible to the processor 70, the processor 70 may be configured to perform the actions described herein.

Figure 5:
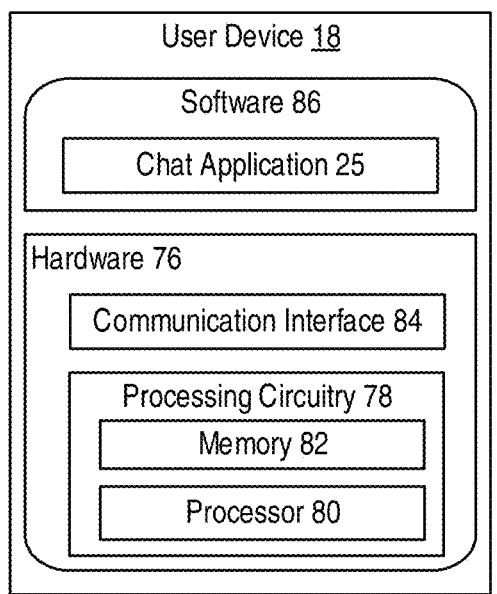
FIG. 5 is a block diagram of an example user device of the system of FIG. 1 according to various embodiments of the present disclosure.

FIG. 5 shows a block diagram illustrating an example user device 18 of system 10. As shown, user device 18 comprises hardware 76. The hardware 76 may include processing circuitry 78. The processing circuitry 78 may include one or more processors 80 and one or more memories 82. Each processor 80 may include and/or be associated with one or more central processing units, data buses, buffers, and interfaces to facilitate operation. In addition to or instead of a processor 80 and memory 82, the processing circuitry 202 may comprise other types of integrated circuitry that performs various functionality. Integrated circuitry may include one or more processors 80, processor cores, FPGAs, ASICs, GPUs, SoCs, or other components configured to execute instructions. The processor 80 may be configured to access (e.g., write to and/or read from) the memory 82, which may comprise any kind of volatile and/or nonvolatile memory, e.g., cache, buffer memory, RAM, ROM, optical memory, and/or EPROM. Further, memory 82 may be embodied in the form of one or more storage devices. The processing circuitry 78 may be configured to perform various functionality described herein. For example, computer instructions may be stored in memory 82 and/or another computer-readable medium that, when executed by processor 80, causes the processor 80 to perform various functionality.

Hardware 76 may include communication interface 84 enabling user device 18 to communicate with one or more elements in system 10. For example, communication interface 84 may be configured for establishing and maintaining at least a wireless or wired connection with one or more elements of system 10 such as control device 22 or computing environment 12 and/or other user devices 18.

User device 18 further has software 86 (which may include one or more software applications) stored internally in, for example, memory 82, or stored in external memory (e.g., database, storage array, network storage devices, etc.) accessible by user device 18 via an external connection. Software 86 may include any software or program that configures processing circuitry 78 to perform the steps or processes of the present disclosure. In one or more embodiments, software 86 comprises chat application 25 that is configured to provide an interface to allow a user 19 of user device 18 to register and participate in a private chat environment as described herein.

Figure 6:
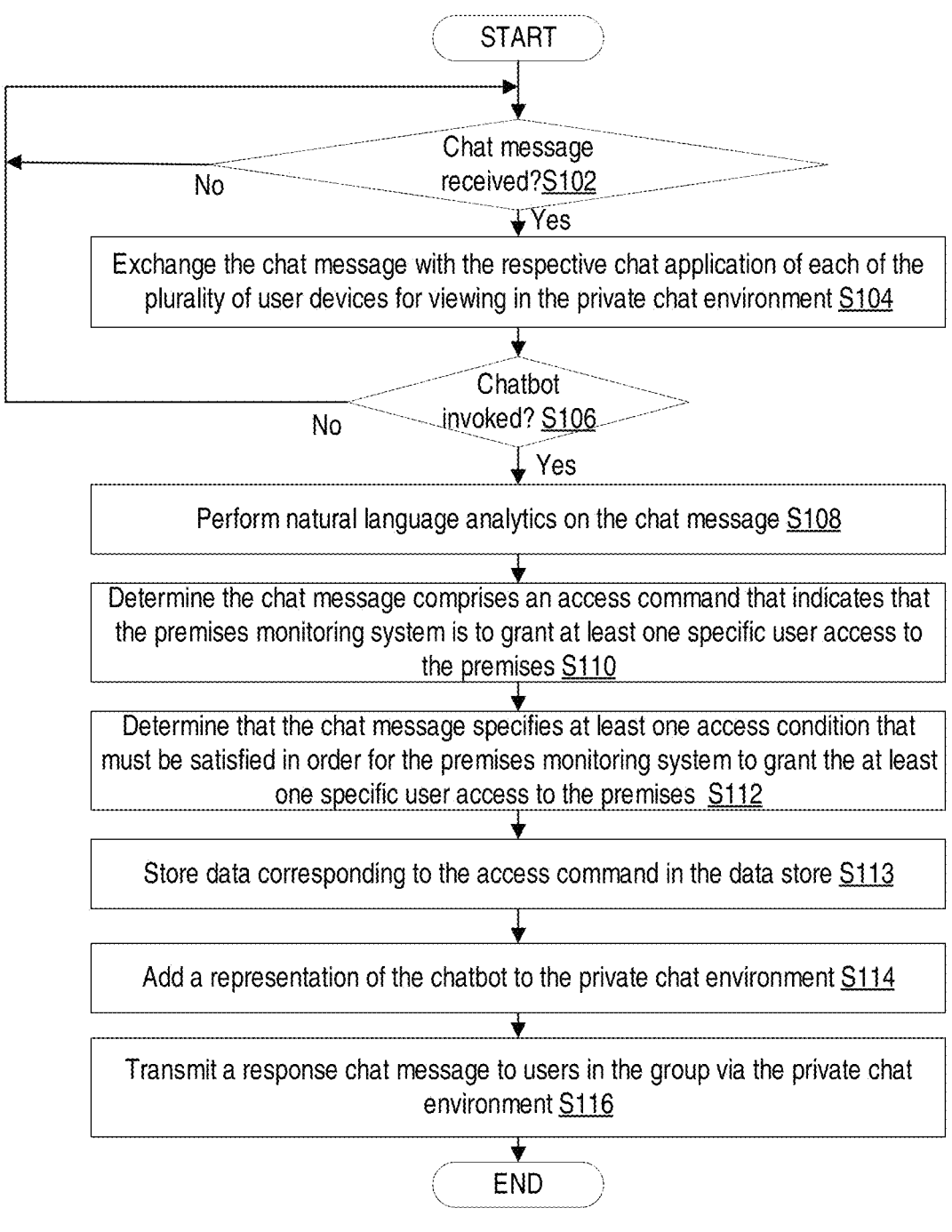
FIG. 6 is a flowchart of an example process implemented by the community messaging system of FIG. 1 according to various embodiments of the present disclosure.

FIG. 6 is a flowchart of an example process performed by the community messaging system 28 of the computing environment 12 according to one or more embodiments of the present disclosure. One or more functions and/or steps described in FIG. 6 may be performed by one or more elements of computing environment 12 such as, for example, one or more of processing circuitry 68, processor 70, communication interface 74, etc. In the present example, users 19 have already registered with the community messaging system 28 and been associated with a private chat environment that corresponds to a premises of at least one of the users 19.

Beginning at block 102, the community messaging system 28 monitors the private chat environment and determines whether a chat message has been sent from a user device 18 and received at computing environment 12 via the private chat environment (Block S102). A chat message in various embodiments can include text, images, video, audio, etc. If no chat message has been received (e.g., user 19 has not input a chat message into the private chat environment), computing environment 12 repeats S102. If a message has been received, community messaging system 28 exchanges the message with the respective chat application 25 of each user device 18 in the group for viewing in the private chat environment (Block S104).

Community messaging system 28 then determines whether chatbot 29 has been invoked in the message (Block S106). In one or more embodiments, the chatbot 29 is invoked by including at least one predefined character in the text message that immediately precedes a predefined designation of the chatbot 29. For example, the at least one predefined character may comprise "@" and the predefined designation of the chatbot may comprise "Virtual Agent" such that the chatbot is invoked, or called upon, when "@Virtual Agent" is in the chat message. Further, other predefined character(s) and/or predefined designation(s) may be used in accordance with the teachings of the present disclosure. For example, the private chat environment and chat application 25 may support multiple languages and emoji characters. In one or more embodiments, a portion of the chat message immediately following the predefined designation of chatbot 29 (e.g., following "@Virtual Agent") comprises at least one user identification (e.g., "@person_1") and at least one access condition for providing access to the premises 16. In one or more embodiments, the identification of a specific user 19 may correspond to another access condition as the specific user 19 is required to be detected at the premises as part of the access granting process described herein.

In response to chatbot 29 being invoked by the chat message, community messaging system 28 then performs natural language analytics processing on the chat message (Block S108). For example, the community messaging system 28 may process the text of the message using natural language analytics in order to, for example, determine that the chat message comprises an access command that indicates that the premises monitoring system 14 is to grant at least one specific user 19 access to premises 16 (Block S110). Additionally, the community messaging system 28 may determine that the chat message specifies at least one access condition that must be satisfied in order for the premises monitoring system 14 to grant the at least one specific user access to the premises 16 (Block S112). As an example, if a chat message comprises text from a user with the username "@Person_1" that reads, "@Virtual Agent: Give @Person_2 access to my house from 5:00-10:00," the community messaging system 28 may apply natural language analytics to the message and determine that the person corresponding to the username "@Person_2" is granted access the premises 16 corresponding to @Person_1 from 5:00-10:00. At block S113, the community messaging system 28 stores data corresponding to the access command in the data store 30. As will be discussed below, the premises monitoring system 14 can later retrieve the stored data when the person is detected at the premises 16 and use the data to determine that the person should be granted access to the premises 16 if the condition(s) corresponding to the access command are satisfied.

Further, in response to the invocation of the chatbot 29, the community messaging system may add a representation of the chatbot 29 to the private chat environment such that chatbot 29 appears as a virtual agent to the users in the private chat environment that can interact with the users in the private chat environment (Block S114). Community messaging system 28 may also transmit a response chat message to users 19 in the group via the private chat environment (Block S116). The response chat message may be a confirmation message indicating that the access command was recognized by the chatbot 29. As an example, a response chat message may state, "@Virtual Agent: @Person_2 will have access to @Person 1's home from 5:00-10:00."

Figure 7:
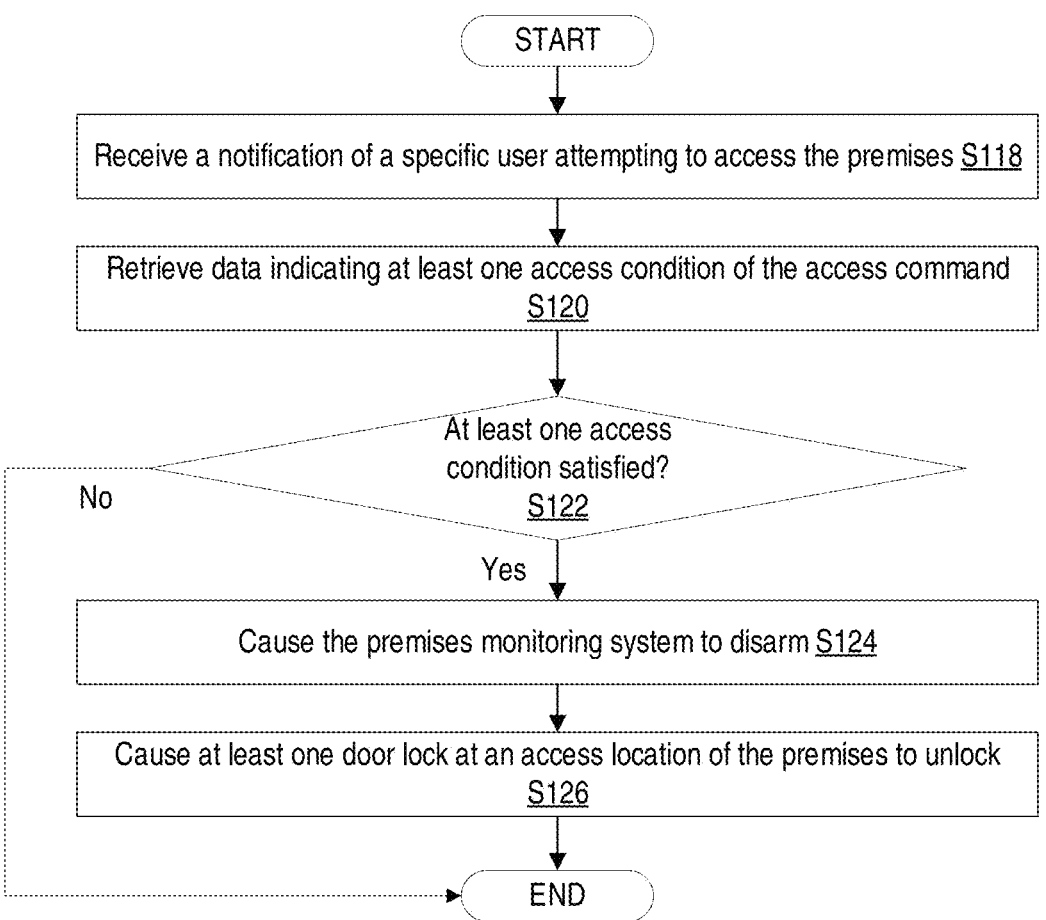
FIG. 7 is a flowchart of an example process implemented by the remote monitoring system of FIG. 1 according to various embodiments of the present disclosure.

FIG. 7 is a flowchart of an example process performed by the remote monitoring system 26 of the computing environment 12 according to one or more embodiments of the present disclosure. One or more functions and/or steps described in FIG. 7 may be performed by one or more elements of computing environment 12 such as, for example, one or more of processing circuitry 68, processor 70, communication interface 74, etc.

The remote monitoring system 26 receives a notification from premises monitoring system 14 of the specific user 19 attempting to access premises 16 (Block S118). For example, the notification may indicate that a face of a specific user has been recognized by premises monitoring system 14 via one or more facial recognition analytics performed by premises monitoring system 14. In response to the notification, remote monitoring system 26 retrieves data from data store 30 where the data indicates at least one access condition of an access command for permitting access to the premises 16 when the at least one access condition is satisfied (Block S120). For example, remote monitoring system 26 retrieves data that was stored by community messaging system 28 at block S113. Remote monitoring system 26 determines whether at least one access condition of the access command is satisfied (block S122). For example, with respect to access command "@Virtual Agent: @Person_2 will have access to @Person_1's home from 5:00-10:00," remote monitoring system 26 determines whether the following access conditions are met: Person_2 is the specific user attempting to access the premises and the attempted access occurs during 5:00-10:00 (e.g., timestamp in the notification indicates a time during 5:00-10:00).

If the at least one access condition is not satisfied, the process may end. However, if the at least one access condition is satisfied, remote monitoring system 26 may cause premises monitoring system 14 to disarm (Block S124) and cause at least one door lock at an access location of the premises 16 to unlock (Block S126). While disarming and unlocking in blocks S124 and S126 are specific responses to one or more specific commands from user 19 in the private chat environment, the present disclosure is not limited to such commands as there are various other commands that may cause computing environment 12, remote monitoring system 26 and/or premises monitoring system 14 to perform different action(s).

Figure 8:
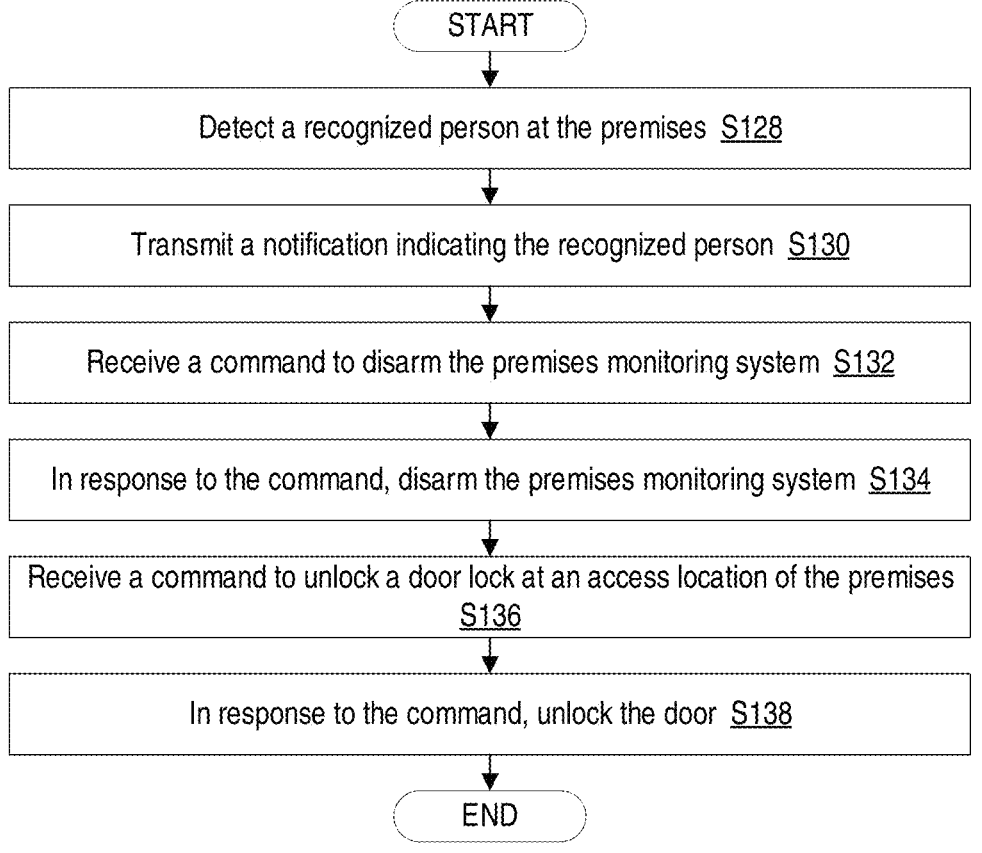
FIG. 8 is a flowchart of an example process implemented by the premises monitoring system of FIG. 1 according to various embodiments of the present disclosure.

FIG. 8 is a flowchart of an example process performed by premises monitoring system 14 according to one or more embodiments of the present disclosure. One or more functions and/or steps described in FIG. 8 may be performed by one or more elements of control device 22 and/or one or more elements of premises device 24.

At block S128, premises monitoring system 14 detects a recognized person at the premises 16 (Block S128). For example, premises device 24*b* may detect a recognized person, using facial recognition, in video captured by premises device 24*b*.

Premises monitoring system 14 is configured to transmit a notification to computing environment 12, where the indication indicates detection of a recognized person (Block S130).

Premises monitoring system 14 is configured to receive, from remote monitoring system 26 of computing environment 12, a command to disarm the premises monitoring system 14 (Block S132). For example, remote monitoring system 26 determined to provide access to the recognized person such that remote monitoring system 26 disarms the premises monitoring system 14.

In response to the command to disarm, premises monitoring system 14 disarms or enters a disarmed state (Block S134). Premises monitoring system 14 is configured to receive a command to unlock a door lock at an access location of the premises 16 (Block S136). In response to the command to unlock, premises monitoring system 14 causes door lock (e.g., premises device 24*c*) to unlock or disengage (Block S138). To this end, a control device 22 of the premises monitoring system 14 may transmit to a networked door lock (e.g., a "smart" lock) a command that causes the door lock to transition from a locked state to an unlocked state.

Figure 9:
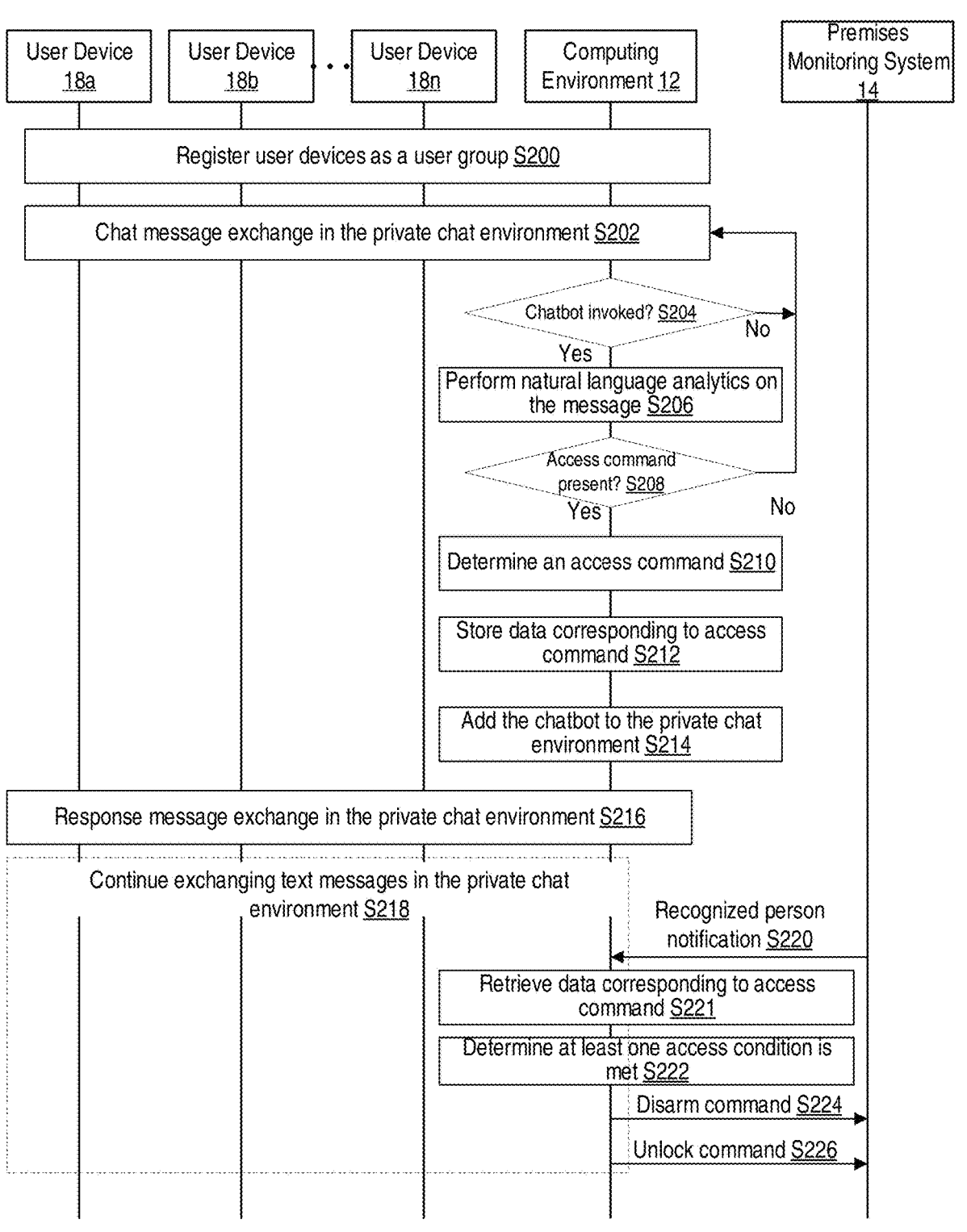
FIG. 9 is a sequence diagram of an example process implemented by various entities of the system of FIG. 1 according to various embodiments of the present disclosure.

FIG. 9 is a sequence diagram of an example process according to one or more embodiments of the present disclosure. In one or more embodiments, one or more of user devices 18*a-n* register with computing environment 12 to form a user group (Step S200). Computing environment 12 and chat application 25 on respective user devices 18 in the group are able to exchange chat messages via a private chat environment (Step S202). For example, the private chat environment may be accessible by user devices 18 that are part of the group.

Computing environment 12 may monitor the private chat environment. In particular, for each chat message exchanged in the private chat environment, computing environment determines whether the message invokes chatbot 29 (Step 204). If chatbot 29 is not invoked by a message, the sequence returns to step S202 for further message exchange. If chatbot 29 is invoked in a chat message, computing environment 12 is configured to perform natural language analytics on the message, as described herein (Step S206).

Computing environment 12 is configured to determine whether an access command is present in the message, as described herein (Step S208). If an access command is not present in the message, the process may return to step S202. If an access command is present in the message, computing environment 12 determines the access command (Step S210). For example, as described herein, the access command may identify one or more specific users and at least one access condition under which to provide the one or more specific users access to the premises. For example, computing environment 12 is configured to determine at least one access condition in the access command such as, for example, based on the results of the natural language analytics. According to one or more embodiments, the at least one access condition comprises at least one of a notification of an event detected by the premises monitoring system 14, a notification of an alarm triggered by the premises monitoring system 14, a notification of a person recognized by the premises monitoring system 14, at least one day of a week, or at least one time period during a day. Computing environment 12 stores, in data store 30, data corresponding to the access command where the data can be retrieved at a later time, as described herein (Block S212).

Computing environment 12 is configured to add chatbot 29 to the private chat environment such that, for example, chatbot 29 can interact with users 19 via the private chat environment. Computing environment 12 exchanges a response message to the users 19 via the private chat environment where the response message may indicate one or more users 19 will be granted access to the premises 16 according to the at least one access condition being satisfied (Step S216). Users 19 in the group may continue to exchange messages via the private chat environment where one or more exchanged messages are process as described above with respect to steps S204-216 (Step S218).

At step S220, premises monitoring system 14 is configured to transmit a notification of a recognized person to computing environment 12 (Step S220). In response to the notification of the recognized person, computing environment 12 is configured to retrieve data corresponding to the access command (Step S221). For example, computing environment retrieves the stored data when the person is detected at the premises 16 and uses the data to determine that the person should be granted access to the premises 16 if the condition(s) corresponding to the access command are satisfied.

Computing environment 12 determines whether an access condition is met or satisfied. In response to computing environment 12 determining the access condition is satisfied (Step S222), computing environment 12 transmits a disarm command (Step S224) and an unlock command (Step S226) to premises monitoring system 14 such as to allow the recognized person access to premises 16.

In one or more embodiments, after the at least one respective user 19 accessed the premises 16, computing environment 12 receives a notification from the premises monitoring system 14 indicating the at least one respective user 19 left the premises, where, in response to the notification, computing environment 12 causes at least one door lock at an access location of the premises 16 to lock, and cause the premises monitoring system 14 to arm. In one or more embodiments, computing environment 12 transmits a notification to the group where the notification is a text message that comprises at least one of a time at which the at least one respective user 19 accesses the premises 16 or a time at which the at least one respective user 19 left the premises 16. Further, in one or more embodiments, chat application 25 may allow users 19 to set and receive reminders in the private chat environment. Further, computing environment 12 may be configured to communicate monthly reminders in the private chat environment of which uses have access to premises 16.

FIG. 10 is a diagram of an example exchange in the private chat environment from the perspective of a user device 18 according to one or more embodiments of the present disclosure. In the example, of FIG. 9, a text message from Person 1 in the private chat environment invokes chatbot 29 using the text "@ Virtual Agent." The text message ("@Virtual Agent give @person 2's family access to my home while I'm traveling") is processed by computing environment 12. For example, computing environment 12 uses natural language analytics to determine the one or more users 19 being granted access (i.e., Person 2 and Person 2's family) and under what conditions to grant access (i.e., while Person 1 is traveling).

Further, in this example, computing environment 12 may be configured to check Person 1's electronic calendar stored in data store 30 to determine Person 1 will be away from premises 16 from Friday until midnight Monday. Computing environment 12 via chatbot 29 may provide a response text message in the private chat environment that confirms the instructions from Person 1. In one or more embodiments, computing environment 12 via chatbot 29 may provide updates in the private chat environment that indicate when premises 16 was accessed and by which user 19. Further, in one or more embodiments, computing environment 12 may be configured to share audio and/or video associated with the access such as by, for example, embedding video in the private chat environment and/or providing a link, such as a uniform resource locator (URL), through which a user 19 may access the video.

Further, in one or more embodiments, in addition to chatbot 29 being configured to respond to natural language requests, chatbot 29 may also be configured to provide context-aware suggested responses for display to one or more users on user device 18. The suggested responses may be clickable, which will submit the suggested response text into the private chat environment. For example, computing environment 12 requests for the homeowner to reset their door lock access code because the homeowner cannot remember it, one of the suggested responses provided by chatbot 29 is "@Virtual Agent reset @Person1's user code" which will generate a new code and send it to the homeowner via a private message after the homeowner clicks or selects the suggested response.

Further, in one or more embodiments, chatbot 29 may also display critical event and/or non-critical event notifications and other relevant information in the private chat environment with a predefined group of users 19 (e.g., @Neighbors) that are able to communicate with each other via the private chat environment. That is, in various embodiments, chatbot 29 may additionally perform the functions of a virtual assistant. For example, chatbot 29 may input message the following message into the private chat environment: "Katie, the dog walker entered the home at 5:11 pm using auto access." For the homeowner, chatbot 29 may provide one or more suggested responses such as "Show Katie's Schedule," "Show Katie's last time accessing the home," or "Pause Katie's access."

FIG. 11 is a diagram of another example exchange in the private chat environment from the perspective of a user device 18 according to one or more embodiments of the present disclosure. In the example of FIG. 10, Person 1 invokes chatbot 29 in order to give Person 3 access to premises 16 around 5:00 μm. The text message is processed as described herein, and computing environment 12 grants Person 6 access to premises 16 since the access condition is satisfied, e.g., Person 6 arrived at premises 16 at 4:43 pm (i.e., around 5:00 pm). In one or more embodiments, the natural language analytics applied to Person 1's text message may interpret "around 5:00 pm" to be, for example, a time window from 4:40-5:20 pm. Further, computing environment 12 may be configured to lock the doors and arm premises monitoring system 14 after the recognized person leaves the premises 16.

FIGS. 12A-12B are a diagram of another example exchange in the private chat environment from the perspective of a user device 18 according to one or more embodiments of the present disclosure. In the example of FIGS. 12A-12B, Person 1 invokes chatbot 29 to grant "@Neighbors" (i.e., a predefined group of users 19) access to premises 16 for package deliveries (e.g., event-based (i.e., event-triggered) access such as for a predefined event detectable by premises monitoring system 14). The text message is processed as described herein, where the group of users 19 (e.g., @Person 2-@Person 7) may be granted access to premises 16 if at least one access condition is satisfied (e.g., detection of a package delivery and a recognized person at premises 16 is one of @Person 2-@Person 7). Further, computing environment 12 may be configured to lock the doors and arm premises monitoring system 14 after the recognized person leaves the premises 16.

In one or more embodiments, the chat capability is configured to facilitate group communications during event-triggered access to premises 16. For example, premises device 24 detects a water leak in premises 16, which triggers a notification to the homeowner and a predefined group of users 19 (e.g., @Neighbors) that are configured to receive these event notifications and access premises 16 in response to the event. The private chat environment allows one of the predefined group of users 19 to acknowledge the event and indicate that the user will travel to premises 16 to investigate the water leak. For example, a user (e.g., @Person 2) states in the private chat environment: "I got it. I'm heading over to the home right now" such that the homeowner and the other users in the predefined group of users 19 are updated as to what is happening. The ability of the private chat environment to provide updates to the predefined group of users 19 helps prevent these users 19 from all traveling to premises 16 only to see another user has gotten there first.

In another example of the chat capability during event-triggered access to premises 16, premises monitoring system 14 has triggered a burglar alarm and the private chat environment may be used to verify the alarm and/or cancel a false alarm. Further, computing environment 12 may be configured to allow and/or initiate an emergency dispatch operator to temporarily join the private chat environment for the duration of the alarm event.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system, comprising:
at least one computing device comprising:
at least one processor; and
at least one memory storing computing instructions that, when executed by the at least one processor, cause the at least one processor to:
monitor a chat environment associated with a plurality of users corresponding to a premises having a premises monitoring system, the premises monitoring system being a security alarm system that monitors for danger to life and property at the premises;
determine that a chat message in the chat environment invokes a chatbot associated with the premises monitoring system, the chat message comprising text, the chat message being from a first user of the plurality of users and referencing a second user of the plurality of users;
in response to determining that the chat message invokes the chatbot, perform natural language analytics on the text of the chat message;
determine an access command based on the natural language analytics performed on the text of the chat message, the access command being an instruction for the premises monitoring system to grant the second user of the plurality of users access to the premises when a condition specified in the chat message is satisfied;
add a confirmation message to the chat environment indicating that the second user will be granted access to the premises according to the condition specified in the chat message being satisfied; and
store access data corresponding to the access command to facilitate the premises monitoring system granting the second user access to the premises when the condition specified in the chat message is satisfied.

2. The system of claim 1, wherein the computing instructions are further configured to cause the at least one computing device to:
determine that the second user is at the premises;

in response to determining that the second user is at the premises, determine based on the access data corresponding to the access command that the second user is permitted access to the premises when the condition specified in the chat message is satisfied;
determine that the condition is satisfied; and
in response to determining that the second user is permitted access to the premises when the condition is satisfied, and to determining that the condition is satisfied, transmit to the premises monitoring system at least one command that:
causes the premises monitoring system to disarm; and
causes a lock at an access location of the premises to unlock.

3. A system, comprising:
at least one computing device, comprising:
at least one processor; and
at least one memory storing computing instructions that, when executed by the at least one processor, cause the at least one computing device to:
monitor a chat environment associated with a plurality of users corresponding to a premises having a premises monitoring system;
determine that a chat message in the chat environment invokes a chatbot associated with the premises monitoring system, the chat message being from a first user of the plurality of users and referencing a second user of the plurality of users;
in response to determining that the chat message invokes the chatbot, determine that the chat message comprises an access command for the premises monitoring system, the access command being associated with access to the premises by the second user; and
store access data based on the access command to facilitate the premises monitoring system implementing the access command.

4. The system of claim 3, wherein the computing instructions are further configured to cause the at least one computing device to:
perform natural language analytics on the chat message; and
determine the access command is present in the chat message based on the natural language analytics.

5. The system of claim 3, wherein the computing instructions are further configured to cause the at least one computing device to:
add a confirmation chat message to the chat environment, the confirmation chat message indicating that the second user will be granted access to the premises according to the access command.

6. The system of claim 3, wherein the computing instructions are further configured to cause the at least one computing device to:
receive a notification from the premises monitoring system that the second user accessed the premises; and
add to the chat environment a notification chat message indicating that the second user accessed the premises.

7. The system of claim 6, wherein the notification chat message comprises at least one of:
a time when the second user accessed the premises; or
a time when the second user left the premises.

8. The system of claim 3, wherein the computing instructions are further configured to cause the at least one computing device to:
receive a notification from the premises monitoring system indicating the second user left the premises;

in response to the notification:

cause at least one door lock at an access location of the premises to lock; and cause the premises monitoring system to arm.

9. The system of claim 8, wherein the computing instructions are further configured to cause the at least one computing device to:

determine that the second user is at the premises;

determine, based on the access data, that the second user is permitted access to the premises according to the access command; and in response to determining that the second user is permitted access to the premises according to the access command:

cause the premises monitoring system to disarm; and cause at least one door lock at an access location of the premises to unlock.

10. The system of claim 3, wherein the computing instructions are configured to cause the at least one computing device to cause the premises monitoring system to disarm and to cause at least one door lock to unlock by at least transmitting at least one command to a control device of the premises monitoring system.

11. The system of claim 3, wherein the chat message further comprises at least one access condition that must be satisfied in order for the second user to be granted access to the premises, the at least one access condition being based on at least one of:

an event being detected by the premises monitoring system;

an alarm being triggered by the premises monitoring system;

a person being recognized by the premises monitoring system;

at least one day of a week; or at least one time period during a day.

12. The system of claim 3, wherein the computing instructions are further configured to cause the at least one computing device to:

determine that the chat message invokes the chatbot based on at least one predefined character in the chat message that precedes a predefined designation for the chatbot.

13. A method implemented by a system, the system comprising at least one computing device, the method comprising:

monitoring a chat environment associated with a plurality of users corresponding to a premises having a premises monitoring system;

determining that a chat message in the chat environment invokes a chatbot associated with the premises monitoring system, the chat message being from a first user of the plurality of users and referencing a second user of the plurality of users;

in response to determining that the chat message invokes the chatbot, determining that the chat message comprises an access command for the premises monitoring system, the access command being associated with access to the premises by the second user; and storing access data based on the access command to facilitate the premises monitoring system implementing the access command.

14. The method of claim 13, further comprising performing natural language analytics on the chat message; and determining the access command is present in the chat message based on the natural language analytics.

15. The method of claim 13, further comprising adding a confirmation chat message to the chat environment, the confirmation chat message indicating that the second user will be granted access to the premises according to the access command.

16. The method of claim 13, further comprising:

receiving a notification from the premises monitoring system indicating the second user left the premises;

in response to the notification:

causing at least one door lock at an access location of the premises to lock; and causing the premises monitoring system to arm.

17. The method of claim 13, further comprising:

determining that the second user is at the premises;

determining, based on the access data, that the user is permitted access to the premises according to the access command; and in response to determining that the user is permitted access to the premises according to the access command:

causing the premises monitoring system to disarm; and causing at least one door lock at an access location of the premises to unlock.

18. The method of claim 13, further comprising causing the premises monitoring system to disarm and to cause at least one door lock to unlock by at least transmitting at least one command to a control device of the premises monitoring system.

19. The method of claim 13, wherein the chat message further comprises at least one access condition that must be satisfied in order for the second user to be granted access to the premises, the at least one access condition being based on at least one of:

an event being detected by the premises monitoring system;

an alarm being triggered by the premises monitoring system;

a person being recognized by the premises monitoring system;

at least one day of a week; or at least one time period during a day.

20. The method of claim 13, further comprising determining that the chat message invokes the chatbot based on at least one predefined character in the chat message that precedes a predefined designation for the chatbot.

* * * * *